United States Patent [19]

Hapke et al.

[11] 3,997,252

[45] Dec. 14, 1976

[54] FILM CASSETTE CONDITIONING MECHANISM

[75] Inventors: Kenyon A. Hapke, Libertyville; Lester V. Jorgensen, Skokie; Roger N. Tyre, Chicago, all of Ill.

[73] Assignee: Polaroid Corporation, Cambridge, Mass.

[22] Filed: Jan. 21, 1975

[21] Appl. No.: 542,783

Related U.S. Application Data

[63] Continuation of Ser. No. 374,287, June 28, 1973, abandoned.

[52] U.S. Cl. .............................. 352/72; 352/130; 352/76
[51] Int. Cl.² ...................................... G03B 23/02
[58] Field of Search ............. 352/72, 75, 76, 78 R, 352/78 C, 130

[56] References Cited

UNITED STATES PATENTS

| 2,095,850 | 10/1937 | Wittel | 352/75 |
| 2,319,530 | 5/1943 | Bolsey | 352/75 |
| 3,641,896 | 2/1972 | Downey | 352/130 |
| 3,800,306 | 3/1974 | Land | 352/130 |

Primary Examiner—Monroe H. Hayes
Attorney, Agent, or Firm—David R. Thornton

[57] ABSTRACT

A mechanism for conditioning a film cassette for plural film handling modes. The mechanism is effective to condition the film cassette for particular film handling modes by controlling the entry of light into the cassette and controlling the status of the film guides and the film pressure plate at the film gate area.

4 Claims, 9 Drawing Figures

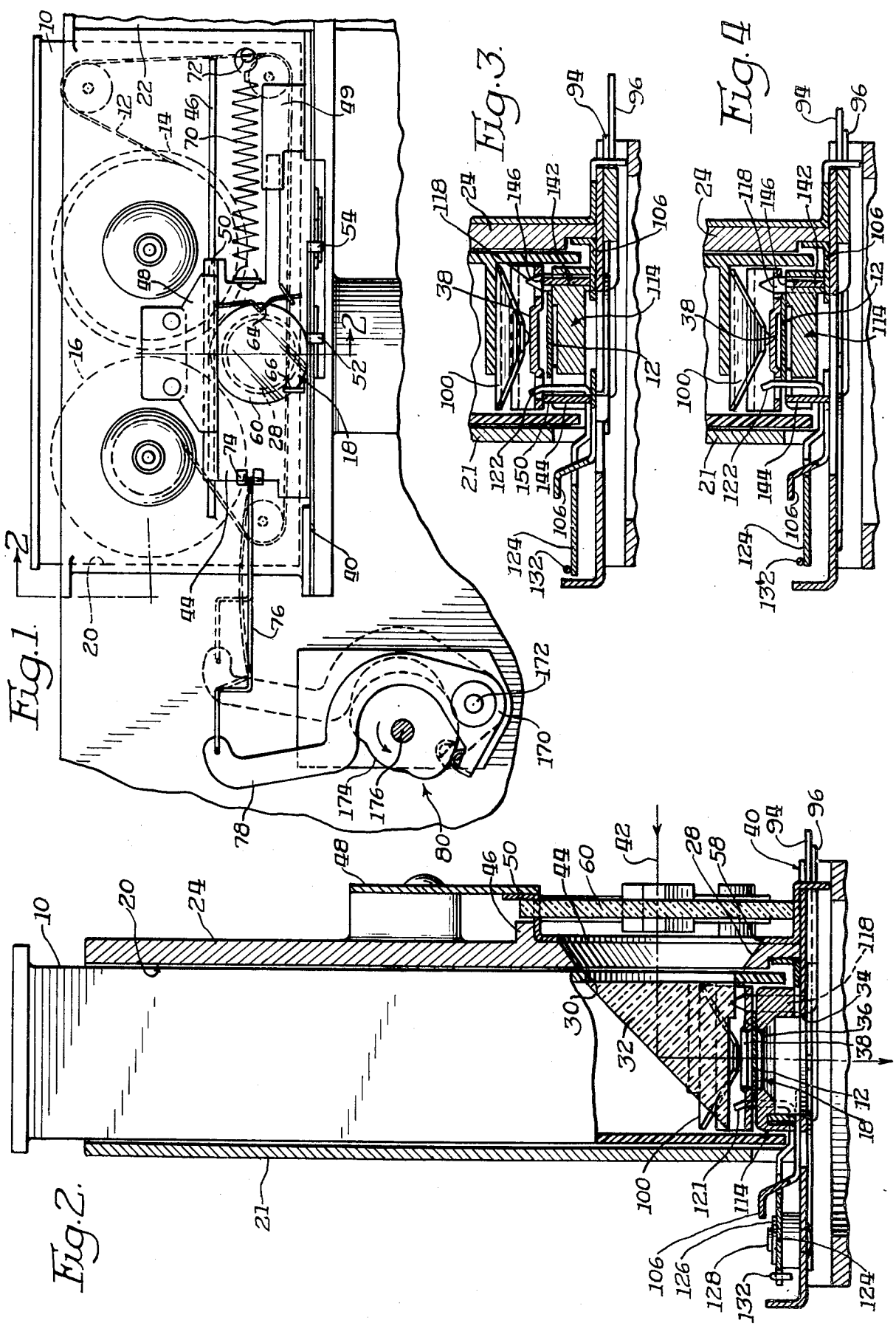

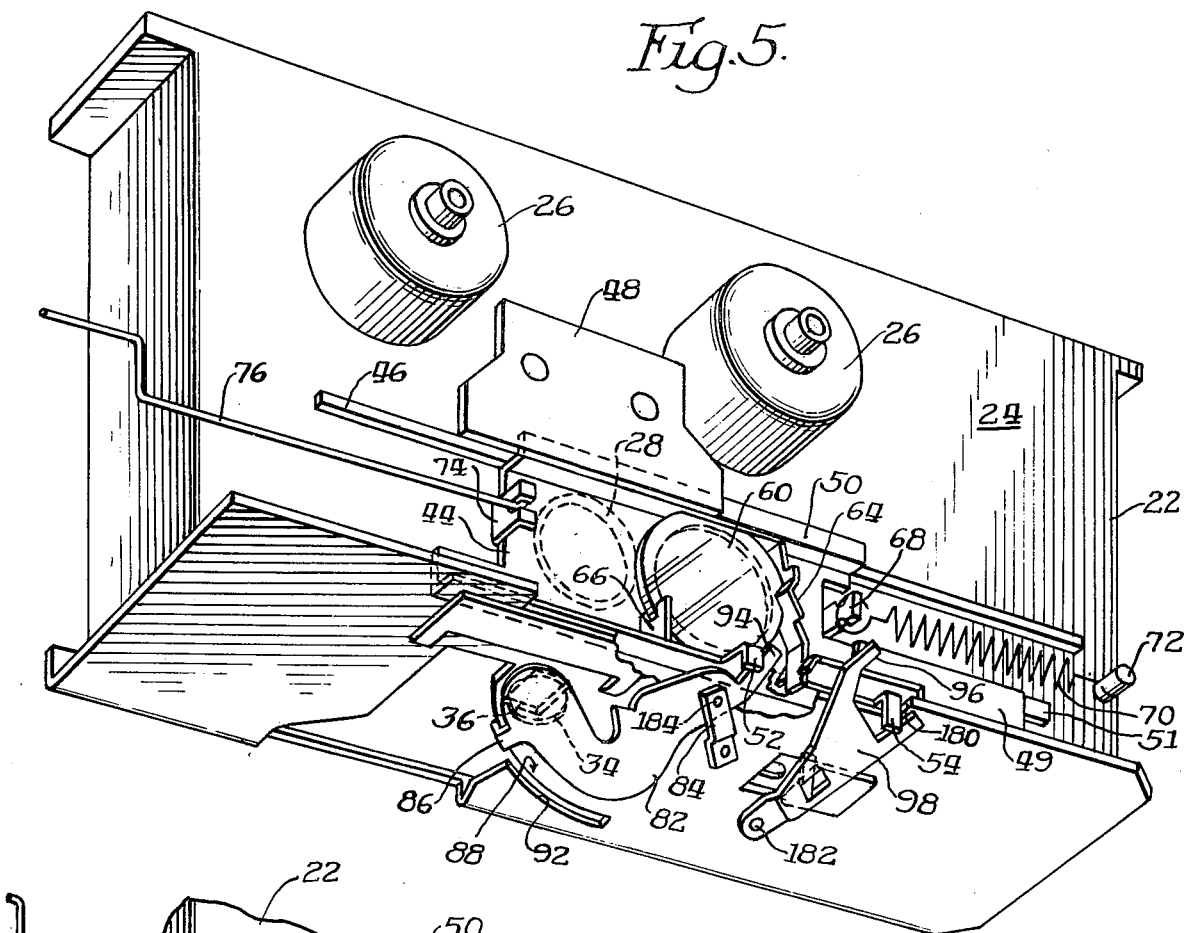
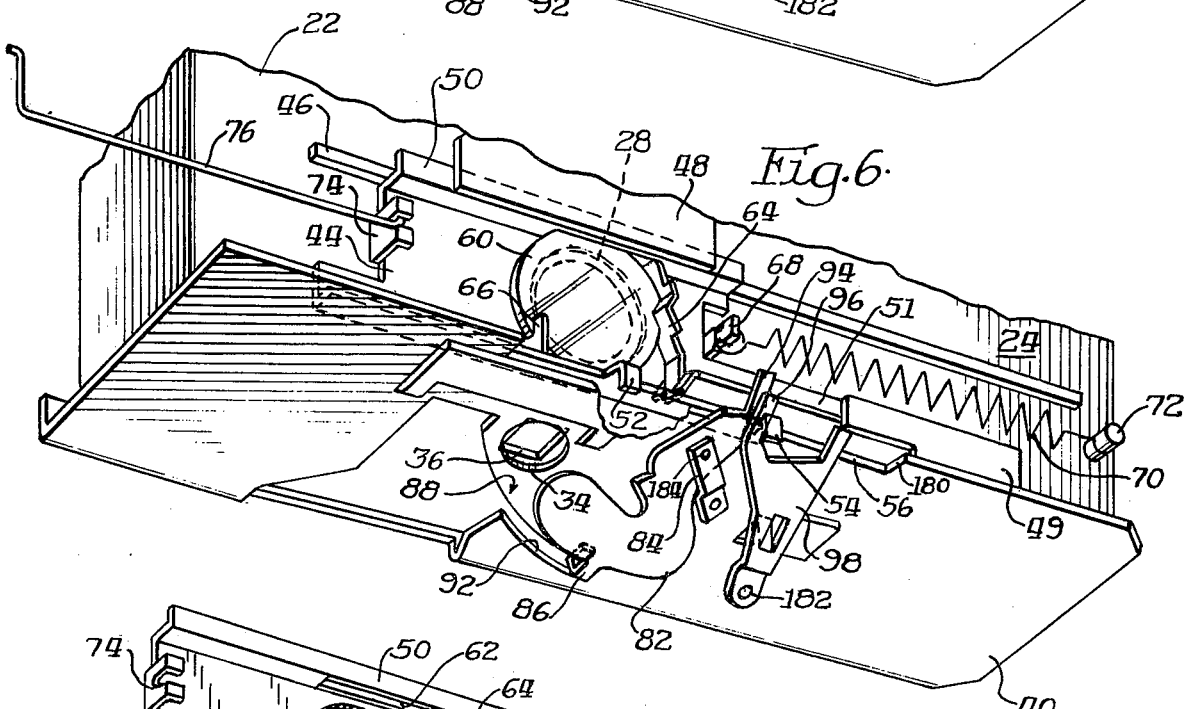
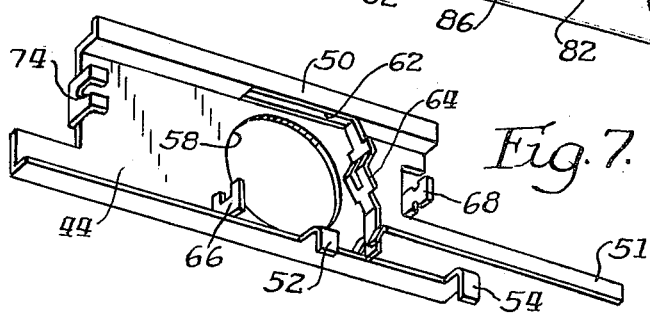

FILM CASSETTE CONDITIONING MECHANISM

This is a continuation of the co-pending U.S. application, Ser. No. 374,287 filed on June 28, 1973 by Kenyon A. Hapke et al. entitled FILM CASSETTE CONDITIONING MECHANISM, now abandoned.

This invention relates to film handling apparatus and, in particular, to a mechanism for conditioning a film cassette for plural film handling modes.

Recent technological advances have made possible a rapid-process cassette system of motion picture photography which permits the photographer himself to expose, process, and project a length of motion picture film, all without removing the film from the cassette. Rapid-process film cassettes of the type referred to are described, for example, in U.S. Pat. No. 3,608,455.

In the rapid-process cassette system, the film cassette is internally provided with processing means comprising a supply of development fluid contained in a rupturable container or pod and an applicator for applying the development fluid to the film emulsion. During exposure in a camera adapted to receive the cassette, the film is advanced from the cassette supply reel to the cassette take-up reel. To process the exposed film, the cassette is removed from the camera and inserted into a processor/projector unit. The development fluid pod in the cassette is ruptured, and a drive system is actuated to transport the exposed film from the take-up reel back to the supply reel. As the film is transported to the supply reel, the applicator within the cassette deposits a coating of the development fluid on the film emulsion surface to effect rapid processing of the film. The film may then be projected by actuating a projection drive shuttle to advance the film from the supply reel to the take-up reel. Following projection, the film is rewound onto the supply reel and conveniently stored in the cassette in readiness for subsequent viewing.

The processor/projector unit in a rapid-process cassette system of the type referred to will be called upon to perform plural operations and functions and is preferably provided with a control system capable of programming and actuating the several operating modes of the processor/projector unit. Such a control system is described in the application of Erwin E. Figge et al, entitled FILM HANDLING APPARATUS CONTROL SYSTEM, filed concurrently herewith and assigned to the same assignee. In this connection, it is important to note that three of the operating modes of the processor/projector unit require particular conditioning of the cassette. During the "Develop" mode in which development fluid is applied to the film emulsion as the film is transported from the take-up reel to the supply reel, it is necessary that ambient light be prevented from reaching the film emulsion, and it is preferable that the film be free to move without unnecessary frictional drag imposed at the film gate area by pressure plate and film guide structures. On the other hand, during the "Project" mode, it is necessary that the projection lamp light beam be permitted to pass through the cassette and film for projection purposes and that the film be closely confined in the film gate by a pressure plate and film side guides so that each film frame is properly imaged for viewing. During the "Rewind" mode, it is again preferable that the film be free of the frictional drag imposed by the pressure plate and film guide structures at the film gate in order to permit rewind of the film onto the supply reel at a high rate of speed.

Accordingly, it is a principal object of the present invention to provide a conditioning mechanism to condition a film cassette for plural film handling modes.

It is a specific object of the present invention to provide a cassette conditioning mechanism including means for controlling the entry of light into the cassette and for controlling the status of the film guides and the film pressure plate at the film gate. In particular, the cassette conditioning mechanism includes cassette light inlet aperture blinder means, a cassette light outlet aperture blinder means, a pressure plate lifter or separator means, a film guide means, and a common actuator means. The mechanism is arranged to have a first state in which both blinder means are closed, the pressure plate separator means is in lift position, and the film guide means is in a retracted position. The mechanism is further arranged to have a second state in which both blinder means are open, the pressure plate separator means is in a retracted position, and the film guide means is in a guide position. The mechanism is preferably spring-biased to first state. The common actuator means includes a timing cam which is effective to selectively bring the mechanism to its second state against the force of the bias spring.

These and other features and objects of the present invention will be better understood by reference to the following detailed description taken in conjunction with the accompanying drawings.

In the drawings:

FIG. 1 is a side view in elevation of a preferred embodiment of the cassette conditioning mechanism of the present invention.

FIG. 2 is a cross-sectional view taken along 2—2 of FIG. 1.

FIG. 3 is a cross-sectional view of a portion of the mechanism of FIG. 1 taken along 3—3 of FIG. 9 to illustrate the pressure plate lifter unit in lift position and the film guide unit in retracted position.

FIG. 4 is a further cross-sectional view of a portion of the mechanism of FIG. 1 taken along 4—4 of FIG. 8 to illustrate the pressure plate lifter unit in retracted position and the film guide unit in guide position.

FIG. 5 is an exterior isometric view of the mechanism of FIG. 1 illustrating the light port blinders closed.

FIG. 6 is a further exterior isometric view of the mechanism of FIG. 1 illustrating the light port blinders open.

FIG. 7 is an isometric view of the inlet light port blinder slide plate.

Figure 8:
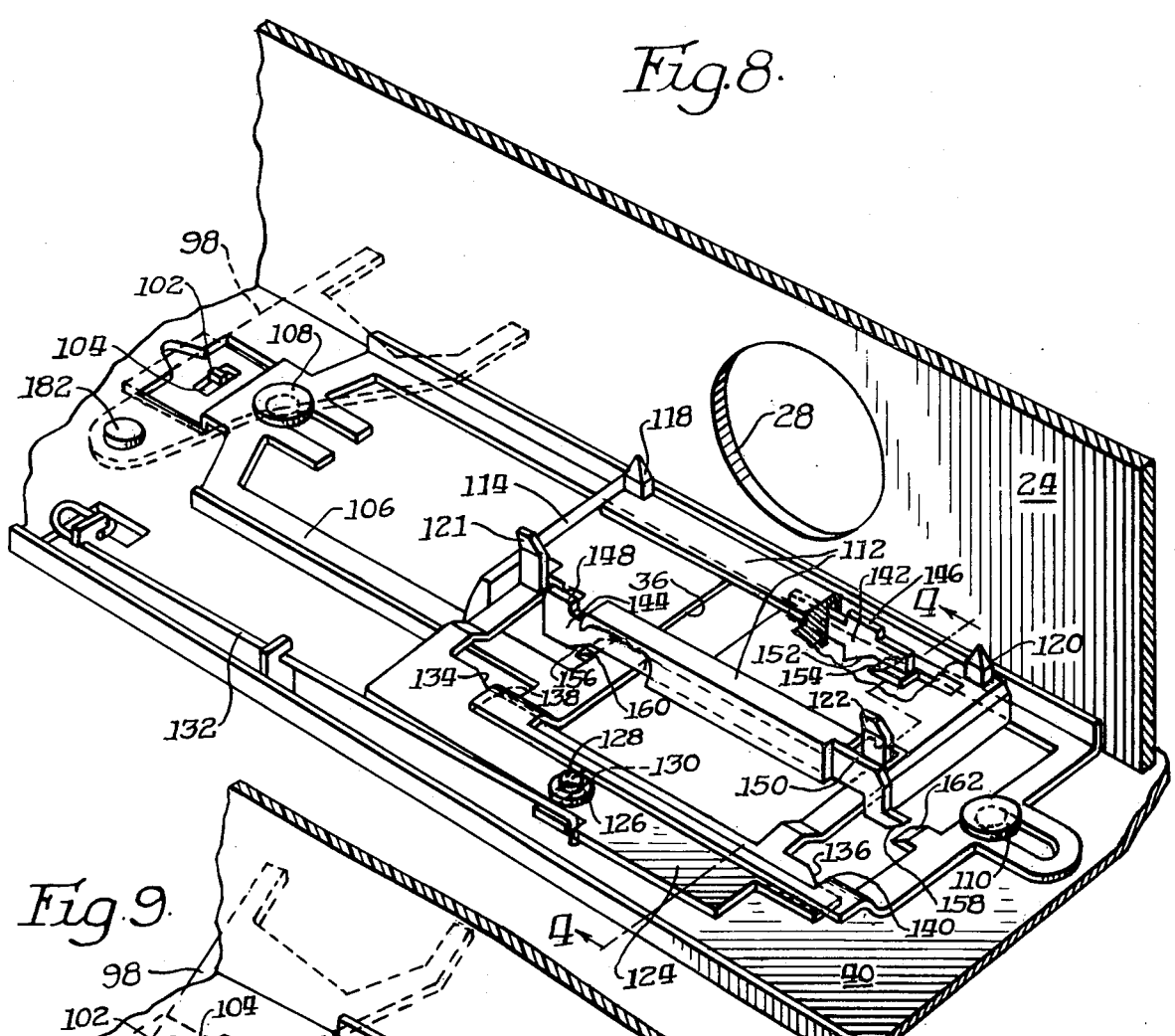
FIG. 8 is an interior isometric view of the mechanism of FIG. 1 illustrating the pressure plate lifters in retracted position and the film guides in guide position.

Referring first to FIGS. 1 and 2 of the drawings, the film cassette conditioning mechanism is illustrated as used, for example, in a processor/projector unit. A film cassette 10 is shown in place in relation to the mechanism. The cassette 10 includes film 12 maintained within the cassette on a supply reel 14 and a take-up reel 16. During operation, the film 12 is transported through a film gate area 18 approximately centrally located along the bottom edge of the cassette in FIG. 1.

The cassette 10 is received within a slot 20 which is formed by walls 21 and 24 of housing 22 approximately mounted in the processor/projector unit. As best illustrated in FIG. 5, the front wall 24 of the housing 22 is provided with a pair of cup-shaped protrusions 26 for containing suitable reel hub drive engagement means for the cassette supply and take-up reels. As illustrated in FIGS. 1, 2, 5, and 6, the front wall 24 further includes a light inlet port 28 through which the light beam from a suitably located projection lamp may be directed to the cassette 10. The cassette 10 itself includes a compatibly located light inlet aperture 30 (FIG. 2) for receiving the projection light beam through the inlet port 28. As illustrated in FIG. 2, the projection light beam upon entering the light inlet aperture 30 is directed by a prism 32 to the film gate area 18 to pass through a suitable aperture in pressure plate 38, the film 12, and a film gate aperture 36 (FIGS. 5 and 6) formed in the film gate platform assembly 114 (FIG. 2). The projection light beam exits from the film gate aperture 36 through a round outlet light port 34 (FIGS. 5 and 6) formed in the floor 40 of the housing 22. The path of the projection light beam is indicated in FIG. 2 by the line 42.

Referring in particular to FIGS. 1, 2, 5, 6, and 7, consideration may next be given to the blinder units included in the conditioning mechanism. The blinder unit for the inlet light port 28 comprises a blinder plate 44 which is slidably mounted and retained in a track formed on one side by the rail 46 and the retainer plate 48 and on the other side by the floor 40 of the housing 22 and by a retainer plate 49. The rail 46 and retainer plate 48 are secured to the front wall 24 of the housing 22 and slidably receive the lip 50 of the blinder plate 44. The retainer plate 49 is secured to housing 22 and acts against a projection 51 of the blinder plate 44. The limits of travel of the blinder plate 44 are determined by the projections 52 and 54 of the blinder plate 44 and the length of the notch 56 in which the projection 54 moves.

The blinder plate 44 is provided with a light inlet opening 58 (FIG. 7) over which is mounted a round glass film burn prevention filter 60. The filter 60 is secured in place on the blinder plate 44 by a slot 62 (FIG. 7), retaining element 66, and leaf spring 64. The blinder plate 44 is further provided with an upstanding projection 68 to which one end of a tension spring 70 is secured. The opposite end of the spring 70 is secured to an anchor post 72. The tension spring 70 serves as a bias spring urging the blinder plate 44 to its closed or rearward position shown in FIG. 5 in which light is precluded by the blinder plate 44 from entering the light port 28. The blinder plate 44 is further provided with another upstanding projection 74 at its opposite end. The projection 74 is notched to receive and engage the locked end of an actuator link 76. The opposite end of the actuator link 76 is pivotally secured to the output arm 78 of a cam follower 170 and timing cam assembly 80 which controls the movement of the blinder plate 44 as hereinafter described.

As illustrated in FIGS. 5 and 6, the blinder unit for the outlet light port 34 comprises a blinder plate 82 which is pivotally mounted adjacent the floor 40 of the housing 22 about pin 184, by a retainer 84 and a projection 86 on the blinder plate 82 which as depicted in FIGS. 5 and 6 moves in an arcuate path against an arcuate guide surface 88 provided on the housing floor 40 and into and out of arcuate slot 92 also provided on the housing floor 40.

The arcuate movement of the outlet port blinder plate 82 is controlled by an integral follower 94. Specifically, the follower 94 is moved in the rearward direction by rearward movement of the projection 52 of the inlet port blinder plate 44 to bring the blinder plate 82 to its closed position covering the outlet light port 34. The rearward movement of blinder plate 44 is terminated and accurately located when projection 54 meets abutment 180 of the floor 40 at which time the inlet light port 28 is covered as depicted in FIG. 5. The follower 94 is moved in the forward direction by forward movement of the projection 54 of the inlet light port blinder plate 44 acting against the rearward edge of follower 94 to bring the outlet light port blinder plate 82 to its open position when the inlet light port blinder plate 44 is in its open position. The forward movement of the blinder plate 44 is terminated and accurately located when projection 54 meets an abutment 180 at the opposite end of notch 56 on floor 40, not shown. Open position of both blinders 44 and 82 is depicted in FIG. 6.

Referring in particular to FIGS. 2 through 4, 8 and 9, consideration will next be given to the film pressure plate lifter, separator, and film guide units included in the conditioning mechanism.

In FIGS. 2 through 4, the pressure plate 38 is shown in cross section. The pressure plate 38 is a part of the structure of the cassette 10 itself and is normally urged against the interior side of the film 12 by a bias spring element 100 so that the film is maintained in a proper film plane for projection as illustrated in FIGS. 2 and 4.

Figure 9:
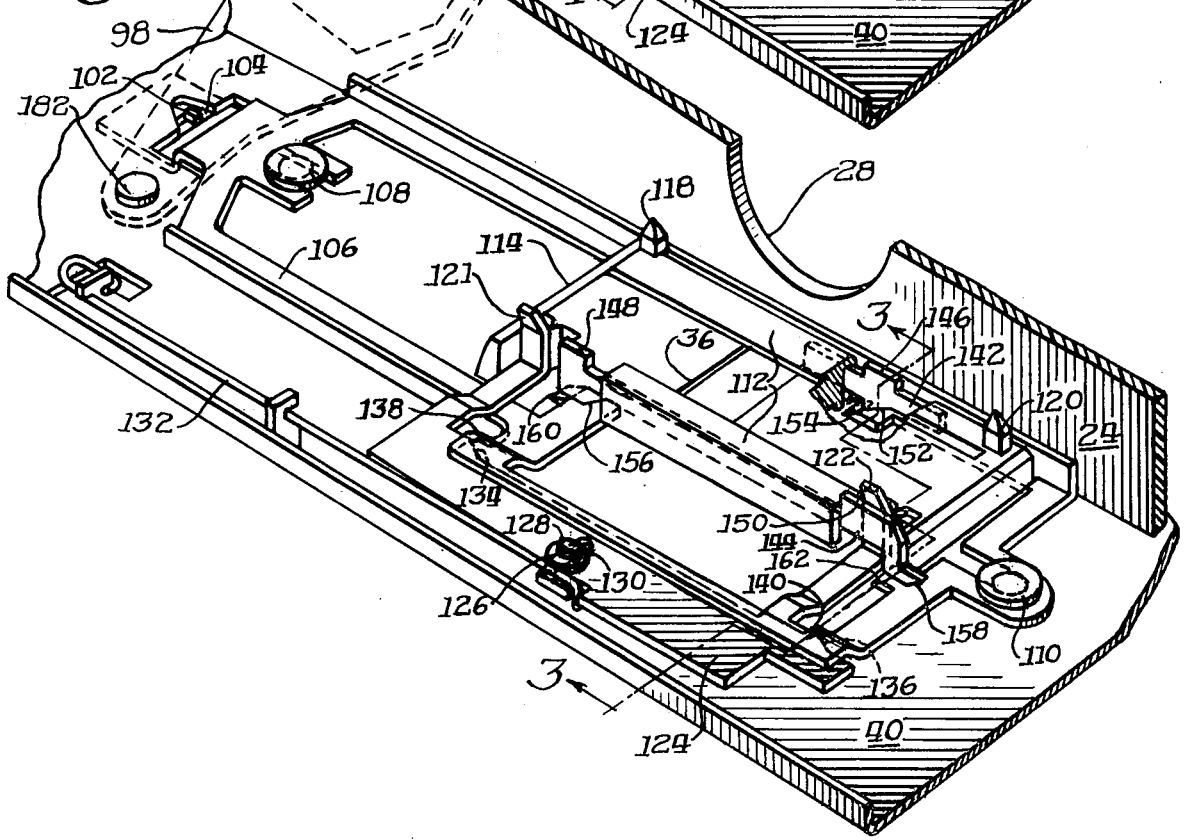
FIG. 9 is a further interior isometric view of the mechanism of FIG. 1 illustrating the pressure plate lifters in lift position and the film guides in retracted position.

Turning now to FIGS. 8 and 9, the pressure plate lifter and film guide structures are illustrated as they appear with the cassette removed for the purpose of clarity. It should be noted at the outset that the pivotal linking plate 98 which is mounted for pivotal movement about pin 182 includes a projection 102 which is received within a follower slot 104 provided in a lifter and film guide control frame 106 which is slidably mounted on the interior surface of the housing floor 40 by guide posts 108 and 110. The frame 106 extends through the region between the interior surface of the housing floor 40 and the exterior surface of the floor 40 where it engages projection 102. The pivotal location of plate 98 is governed by projection 54 of inlet port blinder 44. The limit of travel of projection 54, and therefore the limit of rotation of plate 98, is defined as previously described in the outlet port blinder section. Therefore, through pivotal plate 98, the inlet port blinder 44 also controls the linear position of the control frame 106. A film gate surface 112 of a film gate platform assembly 114 is fixedly mounted on the housing floor 40. The film receiving surface 112 is provided with the film gate aperture 36 for passage of the projection light beam. Associated with the film gate platform assembly 114 is a pair of upstanding pressure plate and film guide posts 118 and 120 which are also fixedly mounted on the housing floor 40. The cassette pressure plate 38 is provided with complementary apertures (not shown) in which the guide posts 118 and 120 are received upon insertion of the cassette to laterally position the pressure plate 38. The guide posts 118 and 120 also provide a registration surface to locate one edge of the film 12 as it passes through the film gate area. The film is urged against guide posts 118 and 120 by a pair of laterally displaceable guide fingers 121 and 122 in the manner illustrated in FIGS. 2 and 4.

The guide fingers 121 and 122 are formed as integral elements of a laterally-displaceable yoke 124 which is engaged by a retainer assembly 126. The pin 128 of the retainer assembly 126 is passed through a laterally-oriented slot 130 in the yoke 124 so as to permit lateral displacement of the yoke 124 perpendicular to the film path direction through the film gate area. The yoke 124 is urged toward the film gate platform assembly 114 by a bias spring 132. The lateral position of the yoke 124 and its integral guide fingers 121 and 122 is determined by the position of the control frame 106. As depicted in FIGS. 8 and 9, the yoke 124 is provided with a pair of ramped follower surfaces 134 and 136 which are arranged to be slidably engaged by respective mating edges 138 and 140 provided on the control frame 106. When the control frame is in its forward position illustrated in FIG. 8, the yoke 124 is freed to laterally advance toward the film gate platform 114 by the spring 132. The guide fingers 121 and 122 are depicted in their guide position illustrated in FIGS. 2, 4, and 8. As the control frame 106 is moved to its rearward position shown in FIG. 9, the control frame edges 138 and 140 bear against the follower ramp surfaces 134 and 136 of the yoke 124 moving the yoke 124 away from the film gate platform to a limit position in which the guide fingers 121 and 122 are retracted from engagement with film as illustrated in FIG. 3.

Referring further to FIGS. 8 and 9, a pair of pressure plate separators or lifters 142 and 144 are mounted in the film gate platform assembly 114 for vertical movement orthogonal to the film receiving surface 112. The pressure plate separator 142 is mounted in one side of the film gate platform assembly 114 and is provided with a single central lifting surface 146 for engaging one side of the cassette pressure plate 38 as illustrated in FIG. 3. The other pressure plate separator 144 is mounted in the opposite side of the film gate platform assembly 114 and is provided with a pair of lifting surfaces 148 and 150 located at opposite ends of the separator 144 for engaging the other side of the cassette pressure plate 38 as shown in FIG. 3. As illustrated in FIGS. 8 and 9, the separator 142 is provided with a ramped follower surface 152 which cooperates with a ramped camming surface 154 provided on the control frame 106. Similarly, the separator 144 is provided with a pair of ramped follower surfaces 156 and 158 which cooperate, respectively, with ramped camming surfaces 160 and 162 provided on the control frame 106. When the control frame is in its forward position illustrated in FIG. 8, the separators 142 and 144 assume a retracted position disengaged from the pressure plate 38 as illustrated in FIG. 4. However, when the control frame is advanced to its rearward position illustrated in FIG. 9, the ramped camming surfaces 154, 160, and 162 bear against the associated follower surfaces 152, 156, and 158 raising the separators 142 and 144 to, in turn, engage and lift the cassette pressure plate 38 against the force of the bias spring 100 as illustrated in FIG. 3. It should be noted that a triangular shaped plane is established by the lifting surfaces 146, 148, and 150 whose apexes have been chosen to provide a stable platform to statically react the single point loading of the cassette pressure plate biasing spring 100.

Referring once again to FIG. 1, it can now be recognized that the timing cam assembly 80 acting through the actuator link 76 serves as a common actuator for controlling the status of the blinders 44 and 82, the film guide fingers 121 and 122, and the pressure plate separators 142 and 144. The timing cam assembly comprises a cam follower 170 which is mounted for pivotal movement about a pivot pin 172. The output arm 78 is an integral part of the cam follower 170 and has a total stroke length slightly longer than that required for blinder 44 to go to the extremes of its travel. At a predetermined time, incident to the requirement that the blinder 44 be "closed," control cam 80 is rotated to a position where arm 78 and link 76 allow spring 70 to pull blinder 44 against aforementioned abutment 180. From this point additional overstroke of arm 78, allowed by cam 80, then creates a slack condition between the hooked end of link 76 and projection 74. Considering, also, the other requirement when the blinder 44 is to be "opened," control cam 80 is rotated to a position where arm 78 and link 76 pull blinder 44 against its location abutment. From this point additional overstroke caused by cam 80 results in intentional deformation of link 76, as depicted in FIG. 1, which acts as a stiff spring to allow for said overstroke. The timing cam 174 is rotated by a suitably driven cam shaft 176 and is shaped to control the status of the cassette conditioning mechanism as described and when required.

Exemplary operation of the cassette conditioning mechanism may be considered as applied to a processor/projector unit under the control of a control system such as disclosed in the aforementioned application of Erwin E. Figge et al, entitled FILM HANDLING APPARATUS CONTROL SYSTEM.

During the develop mode of the processor/projector unit, the timing cam assembly 80 will bring the conditioning mechanism to what may be termed its "actuated" state in which the blinder plate 44 is in its closed position shown in FIG. 1. In the actuated state, entry of light into the cassette is precluded since both the blinders 44 and 82 are in their closed positions, depicted in FIGS. 1 and 5. Further, unnecessary frictional film gate drag on the film 12 is removed since, as depicted in FIGS. 3 and 9, the pressure plate separators 142 and 144 are in their "separate" position to lift the cassette pressure plate 38 to a retracted position, and the film guide fingers 121 and 122 are in their retracted position. Accordingly, ambient light is prevented from interfering with development of the film, and the film is permitted to pass through the film gate area without unnecessary frictional drag. Similarly, for the "rewind" mode of the processor/projector unit, the conditioning apparatus is brought to its actuated state by the timing cam assembly 80 for the purpose of freeing the film 12 of unnecessary frictional drag in the film gate area to enable rapid rewind of the film onto the supply reel.

For the "project" mode of the processor/projector, the conditioning apparatus is brought to what may be termed its "de-actuated" state in which both blinders 44 and 82 are in their open position as illustrated in FIG. 6 to permit passage of the projection light beam through the film and the film gate area for projection purposes. In the de-actuated state of the conditioning mechanism, the pressure plate separators 142 and 144 are in their retracted position disengaged from the pressure plate 38, and the film guide fingers 121 and 122 are in their guide position. Thus, the film is properly confined in the film gate area so that each film frame is properly imaged for viewing.

It will be recognized by those skilled in the art that modifications and changes may be made in the foregoing exemplary embodiment of the cassette conditioning mechanism of this invention without departing from the scope of the invention. For example, it may be desirable to revise or eliminate particular functions of the mechanism to fit the needs of a particular application of the invention.

What is claimed is:

1. In a processor/projector apparatus having plural operating modes and adapted to receive a film cassette having an integral, spring-loaded pressure plate over which the film is movable, a conditioning mechanism for conditioning the film cassette for plural operating modes comprising:
    a housing providing a slot for receiving said cassette and a film gate surface for cooperating with said pressure plate to closely confine the film therebetween during a projection mode;
    an inlet light port in said housing for the passage of a projection lamp light beam to said cassette during a projection mode;
    an outlet light port in said housing for the passage of the projection lamp light beam from said cassette during said projection mode;
    a first blinder mounted externally of said cassette in proximity to said inlet light port and movable between a closed position for preventing the passage of light through said inlet light port and an open position for permitting the passage of light through said inlet light port;
    a second blinder mounted externally of said cassette in proximity to said outlet light port and movable between a closed position for preventing the passage of light through said outlet light port and an open position for permitting the passage of light through said outlet light port;
    pressure plate displacing means movable in a direction perpendicular to the plane of said film gate surface between an active position and a retracted position, said spring-loaded pressure plate displacing means being effective in moving to said active position to displace said pressure plate away from said film gate surface;
    slide cam means movable in a direction parallel to the plane of said film gate surface for camming the movement of said pressure plate displacing means between said active position and said retracted position; and
    actuator means including a single rotary timing cam and a cam follower means spring-biased into engagement with the cam surface of said rotary timing cam for translating rotary motion of said timing cam surface into reciprocal motion transmitted to said first and second blinders and to said slide cam means for effecting correlated movement of said first and second blinders to their respective closed positions and said slide cam means to its active position for a development mode and for effecting correlated movement of said first and second blinders to their respective open positions and said slide cam means to its retracted position for a projection mode.

2. The invention defined in claim 1 further comprising:
    pressure plate separators movable between a retracted position and a separate position, said pressure plate separators being effective in said separate position to displace said spring-loaded pressure plate against the force of its loading spring, said actuator means being operative to effect movement of said pressure plate separators to said separate position for a development mode and to effect movement of said pressure plate separators to said retracted position for a projection mode.

3. The invention defined in claim 1 further comprising:
    a plurality of guide elements adapted to guide the respective side edges of the film during passage of the film across the said film gate surface for a projection mode, at least said guide elements which are adapted to guide one side edge of the film being laterally movable between a guide position and a retracted position, said slide cam means being operative to effect movement of said movable guide elements to their retracted position for a development mode and to effect movement of said movable guide elements to their guide position for a projection mode.

4. The invention defined in claim 1 further comprising:
    means linking one of said first and second blinders to said slide cam means such that movement of said one blinder to its closed position effects movement of said slide cam means to its active position and movement of said one blinder to its open position effects movement of said slide cam means to its retracted position; and
    means linking said one blinder to the other of said first and second blinders such that movement of said one blinder to its closed position effects movement of said other blinder to its closed position and movement of said one blinder to its open position effects movement of said other blinder to its open position.

* * * * *